March 26, 1963 G. E. ANDREWS ETAL 3,083,257
LIQUID-INSULATED ELECTRIC CABLES
Filed Sept. 23, 1959

INVENTORS
GLENN E. ANDREWS
GEORGE FEICK III
BY
ATTORNEYS

# United States Patent Office 3,083,257
Patented Mar. 26, 1963

3,083,257
LIQUID-INSULATED ELECTRIC CABLES
Glenn E. Andrews and George Feick III, Needham, Mass., assignors, by mesne assignments, to Anaconda Wire and Cable Company, Hastings on Hudson, N.Y., a corporation of Delaware
Filed Sept. 23, 1959, Ser. No. 841,715
8 Claims. (Cl. 174—14)

This invention relates to electric power cables of the type which include an extended outer enclosure member and an insulating liquid contained within the enclosure member and, more particularly, to such a liquid-insulated electric power cable combined with a new self-pumping system for circulating the insulating liquid through the enclosure member.

Dielectric hydrocarbon oil which has been used as an insulating fluid in an electric power cable of the type described usually evidences a certain amount of chemical deterioration after exposure to high voltages over prolonged periods of time. Such deterioration appears to be due to a progressive oxidative degradation of the oil which causes a reduction in its dielectric strength and a corresponding increase in its power factor. Consequently, sustained use of a given quantity of dielectric oil in a power cable operating at high voltages impairs the dielectric efficiency of the cable insulation. This effect is particularly noticeable in conventional lead-sheathed and pipe-type cables containing a hydrocarbon oil impregnant since the oil is usually introduced into the cable as a permanent insulating medium.

Primarily, it is the purpose of this invention to provide means for maintaining liquid-insulated electrical cables of this type at substantially their original insulating efficiency notwithstanding the degradation that the liquid undergoes during operation of the cable. This broad purpose is achieved by combining with the cable a novel system for circulating the dielectric liquid through the cable so that the used dielectric liquid is substantially continuously displaced by newly-conditioned liquid. The system contemplates employing the periodic power load changes on the cable to achieve the pumping action required to effect the circulation.

In general, the new circulating means is provided in combination with an electric power cable which includes an extended outer enclosure member and a dielectric liquid contained within the outer enclosure member. The circulating means comprise an inlet conduit leading from a source of the liquid and communicating with the interior of the enclosure member. An inlet check valve is provided in the inlet conduit to permit unidirectional flow of the liquid from this source into the enclosure member of the cable. Also, an outlet conduit is provided which communicates with the interior of the enclosure member at a point remote from the point where the inlet conduit communicates therewith. An outlet check valve is included in the outlet conduit which permits unidirectional flow of the liquid out of the enclosure member. Hence, variations in the temperature of the cable during operation cause contraction and expansion of the liquid therewithin which alternately draws the liquid into and forces it out of the enclosure member through the inlet and outlet check valves respectively.

These variations in the temperature of the cable are a result of the periodic power load fluctuations to which virtually all cables are subjected during the course of their daily operation. When the power load increases, the conductors of the cable are heated and they raise the temperature of the dielectric liquid within the enclosure member. Conversely, a decrease in the power load cools the conductors and they then lower the temperature of the surrounding dielectric liquid. Hence, a corresponding cyclic contraction and expansion of the liquid occurs within the cable during its operation. This cyclic expansion and contraction is used according to this invention to pump the liquid in through the inlet check valve and out through the outlet check valve.

When the dielectric liquid is pressurized, as it often is in electric power cables for very high voltage service, a preferred form of the invention provides correspondingly pressurized supply and discharge reservoirs from which and into which the liquid may be delivered. The invention also contemplates the use of a suitable recycling system between the supply and discharge reservoirs which permits the used oil to be re-conditioned to its original insulating efficiency.

These and other advantages of the invention are apparent in the following description of preferred embodiments thereof, wherein FIG. 1 is a schematic illustration of a lead-sheathed oil-filled cable combined with the new circulating means;

Figure 2:
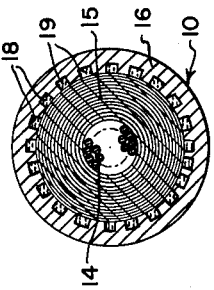
FIG. 2 is a section taken along the line 2—2 of FIG. 1.
Figure 1:
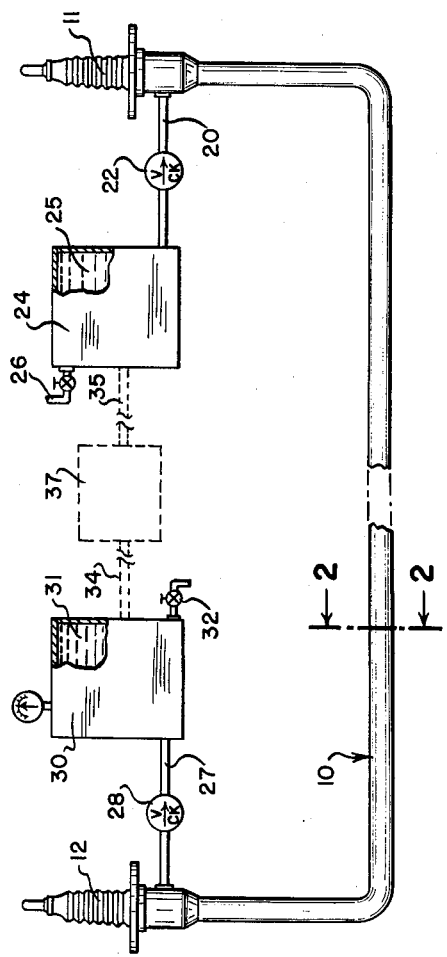

Referring first to FIGS. 1 and 2, a length of lead-sheathed electric power cable 10 is shown terminated at its opposite ends with conventional potheads 11 and 12. The cable 10 includes an inner multi-stand conductor 14, a layer of oil-permeable paper tape 15 helically wrapped about the conductor 14 throughout its length, and a close-fitting extended outer lead sheath 16. On the inside surface of the outer lead sheath 16 are formed a plurality of longitudinally arranged channels 18 extending about the periphery of the layer of paper tape 15 throughout substantially its entire length. When the cable 10 is installed, a dielectric hydrocarbon oil 19 is forced under pressure through the channels 18 so that the oil completely impregnates the paper tape 15 to insulate the conductor 14. Typical oil pressure in a lead-sheathed cable of this type is about 0 to 25 p.s.i. above atmospheric.

According to the invention, an inlet conduit 20 is connected to one end portion of the cable 10, for example at the base of the pothead 11 as in the embodiment shown. The inlet conduit 20 communicates with the interior of the outer lead sheath 16 to provide access to the channels 18. Located in the inlet conduit 20 is an inlet check valve 22 of any suitable type which permits unidirectional flow only into the cable 10. At the end of the inlet conduit 20 remote from the pothead 11 is an enclosed supply tank 24 containing a reservoir 25 of the cable oil 19 in its newly-conditioned state. The reservoir 25 is at a pressure equal to that within the cable 10, so that under normal conditions there is no flow of oil through the inlet check valve 22. A valved inlet 26 is provided in the supply tank 24 to permit the oil to be introduced into the tank 24 when desired.

At the opposite end of the lead-sheathed cable 10, an outlet conduit 27 is connected to the base portion of the pothead 12 in communication with the channels 18 in the cable. Located in the outlet conduit 27 is an outlet check valve 28 of any suitable type which permits flow only out of the cable 10. At the end of the outlet conduit 27 remote from the pothead 12 is an enclosed discharge tank 30 which contains a discharge reservoir 31 of the cable oil 19 in its used (slightly degraded) state. The reservoir 31 is also at a pressure equal to that within the cable 10, so that under normal conditions there is no flow of oil through the outlet check valve 28. A valved drain 32 is provided in the discharge tank 30 to withdraw oil from it as desired.

During the operation of the cable 10, the conductor 14 is cyclically heated and cooled by corresponding periodic increases and decreases in the amount of current carried thereby. Such variations in the power load on the cable 10 occur regularly in virtually all electrical systems as the power demand fluctuates during the course of the cable's daily operation. As a result, the temperature of the oil 19 therewithin also rises and falls periodically, thereby causing it to expand and contract correspondingly. When the oil 19 contracts, the internal pressure within the cable 10 decreases and the inlet check valve 22 opens to admit the newly-conditioned oil from the reservoir 25 into the cable at the pothead 11. Conversely, when the oil 19 expands, the internal pressure within the cable 10 increases and forces the used oil at the pothead 12 through the outlet check valve 28 into the reservoir 31. Since the points at which the inlet and outlet conduits 20 and 27 communicate with the interior of the lead sheath 16 are remote from one another, an intermittent circulation of the oil 19 is effected from the pothead 11 to the pothead 12 through the entire length of the cable 10.

The particular construction of the cable 10 and potheads 11 and 12 in FIGS. 1 and 2 are shown only for purposes of illustration. It should be clear that many other types of lead-sheathed cables may be combined with the new circulating means. For example, there may be three conductors 14 within the lead sheath 16, each insulated by its own layer of paper tape 15. Also, rather than having grooves 18 on the inside surface of the lead sheath 16, there may be continuous oil passages formed or provided in the valley spaces between two or more conductors or otherwise provided within the sheath.

It may also be advantageous to incorporate a recycling system in this new circulating means, as shown in dotted lines in FIG. 1. This may include a discharge conduit 34 leading from the discharge tank 30, or directly from the outlet conduit 27, and a supply conduit 35 leading into the supply tank 24, or directly into the inlet conduit 20. Between the discharge and supply conduits 34 and 35, and in communication therewith, there may be provided a re-conditioning unit 37 of any suitable type. In such a unit 37, the degraded oil is treated to return it to its original insulating efficiency, so that it is ready to be recirculated back through the cable 10.

Figure 4:
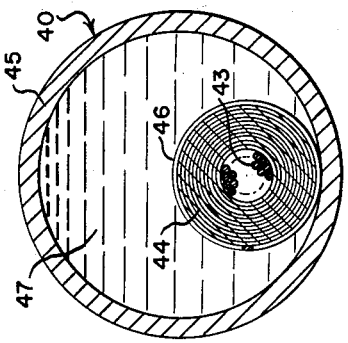
FIG. 4 is a section taken along the line 4—4 of FIG. 3.
Figure 3:
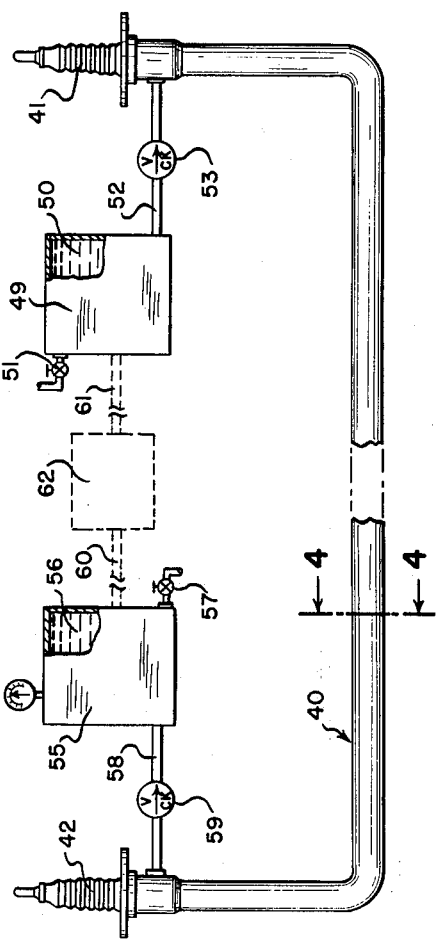
FIG. 3 is a schematic illustration of a pipe-type oil-filled cable combined with the new circulating means.

Referring now to the embodiment shown in FIGS. 3 and 4, the new circulating means is there shown in combination with a pipe-type electric power cable 40 terminated at its opposite ends with conventional potheads 41 and 42. The cable 40 includes an inner multi-strand conductor 43, an oil-permeable layer of paper tapes 44 helically wrapped about the conductor 43 throughout its length, and an extended outer steel pipe 45 enclosing and spaced from the paper-covered conductor 43. Suitable shielding tape and/or skid wires 46 may also be helically wrapped about the paper tape 15. When the cable 40 is installed, a dielectric oil 47 is forced under pressure into the pipe 45 around the paper-covered conductor 43 to impregnate the paper tape 15. The oil pressure in a typical pipe-type cable of this sort is approximately 200 p.s.i. above atmospheric.

In this embodiment the new circulating means includes an enclosed supply tank 49 containing a supply reservoir 50 for the cable oil 47 in its newly-conditioned state. The reservoir 50 is pressurized at a pressure equal to that within the cable 40. A valved inlet 51 extends from the supply tank 49 to provide means for introducing the oil into the tank 49 when desired. An inlet conduit 52 leads from the supply tank 49 into the base of the pothead 41 so that the reservoir 50 communicates with the interior of the pipe 45. Located in the inlet conduit 52 is an inlet check valve 53 permitting unidirectional flow of the oil 47 from the reservoir 50 into the pipe 45.

To provide a depository for the oil 47 after its use as a dielectric in the cable, an enclosed discharge tank 55 is provided which contains a discharge reservoir 56 for the used cable oil 47. The reservoir 56 is also under pressure equal to that within the cable 40 and a valved drain 57 is provided in the tank 55 to empty it when desired. Leading from the tank 55 to the base portion of the pothead 42 is an outlet conduit 58 which provides communication between the reservoir 56 and the interior of the pipe 45. An outlet check valve 59 is provided in the outlet conduit 58 for permitting unidirectional flow of the oil 47 out of the pipe 45 into the tank 55.

As in the previous embodiment, the temperature of the conductor 43 varies cyclically during the operation of the cable 40 and causes contraction and expansion of the oil 47 therewithin. When the oil 47 contracts, newly-conditioned oil from the reservoir 50 is admitted into the cable through the inlet check valve 53 and, conversely, when the oil 19 expands, the used oil at the other end of the cable is forced out through the outlet check valve 28 into the reservoir 56. Since the inlet and outlet conduits 52 and 58 respectively communicate with the interior of the pipe 45 at remotely spaced junctions, the oil 47 is intermittently circulated throughout substantially the entire length of the cable 40.

Again, the particular construction of the cable 40 and potheads 41 and 42 is shown only for purposes of illustration. Thus, the circulating means of the invention may be combined with many other designs of pipe-type cables other than the single-conductor type shown in the drawings.

As shown in dotted lines in FIG. 3, a recycling system may be incorporated in the new circulating means. Such a system may include a discharge conduit 60 leading from the discharge tank 55 and a supply conduit 61 leading into the supply tank 49. A re-conditioning unit 62 may be located between the discharge and supply conduits 60 and 61 in communication therewith. The unit 62 may be of any suitable type which is capable of treating the used oil to return it to its original insulating efficiency so that it is prepared for re-circulation back through the cable 40.

We claim:

1. In an electric power cable which includes an extended outer enclosure member and a dielectric liquid contained within said outer enclosure member, means for circulating said liquid through said enclosure member comprising an exterior source of said liquid, an inlet conduit leading from said source and communicating with the interior of said enclosure member, an inlet check valve in said inlet conduit permitting unidirectional flow of said liquid from said source into said enclosure member, an outlet conduit communicating with the interior of said enclosure member at a point remote from the point where said inlet conduit communicates therewith, and an outlet check valve in said outlet conduit permitting unidirectional flow of said liquid out of said enclosure member, whereby variations in the temperature of said cable during operation cause contraction and expansion of the liquid therewithin and alternately draw the liquid into and force it out of said enclosure member through said inlet and outlet check valves respectively.

2. In an electric power cable which includes an extended outer enclosure member and a dielectric liquid contained within said outer enclosure member, means for circulating said liquid through said enclosure member comprising a supply reservoir providing a source of said liquid, an inlet conduit leading from said supply reservoir and communicating with the interior of said enclosure member, an inlet check valve in said inlet conduit permitting unidirectional flow of said liquid from said supply reservoir into said enclosure member, an outlet conduit communicating with the interior of said enclosure member at a point remote from the point where said inlet conduit communicates therewith and leading to said reservoir, and an outlet check valve in said outlet conduit permitting unidirectional flow of said liquid out of said enclosure member back to said reservoir, whereby variations in the temperature of said cable during operation cause contraction and expansion of the liquid therewithin and alternately draw the liquid into and force it out of said enclosure member through said inlet and outlet check valves respectively.

3. In an electric power cable which includes an extended outer enclosure member and a pressurized dielectric liquid contained within said enclosure member, means for circulating newly-conditioned dielectric liquid through said enclosure member comprising an enclosed supply reservoir providing a source of newly-conditioned liquid under pressure equal to that within said cable, an inlet conduit leading from said supply reservoir and communicating with the interior of said enclosure member, an inlet check valve in said inlet conduit permitting unidirectional flow of said liquid from said supply reservoir into said enclosure member, an enclosed discharge reservoir under pressure equal to that within said cable providing a depository for said liquid after its use as a dielectric in said cable, an outlet conduit communicating with the interior of said enclosure member at a point remote from the point where said inlet conduit communicates therewith and leading into said discharge reservoir, an outlet check valve in said outlet conduit permitting unidirectional flow of said liquid out of said enclosure member into said discharge reservoir, whereby variations in the temperature of said cable during operation cause contraction and expansion of the liquid therewithin and alternately draw the liquid into and force it out of said enclosure member through said inlet and outlet check valves respectively.

4. In an electric power cable which includes an extended outer enclosure member and a pressurized dielectric oil contained within said enclosure member, means for circulating newly-conditioned dielectric oil through said enclosure member comprising an enclosed supply reservoir providing a source of said newly-conditioned oil under pressure equal to that within said cable, an inlet conduit leading from said supply reservoir and communicating with the interior of said enclosure member, an inlet check valve in said inlet conduit permitting unidirectional flow of said oil from said supply reservoir into said enclosure member, an enclosed discharge reservoir under pressure equal to that within said cable providing a depository for said oil after its use as a dielectric in said cable, an outlet conduit communicating with the interior of said enclosure member at a point remote from the point where said inlet conduit communicates therewith and leading into said discharge reservoir, an outlet check valve in said outlet conduit permitting unidirectional flow of said oil out of said enclosure member into said discharge reservoir, and a recycling system comprising means for withdrawing the used oil from said discharge reservoir and re-conditioning it and then introducing the re-conditioned oil into said supply reservoir, whereby variations in the temperature of said cable during operation cause contraction and expansion of the oil therewithin and alternately draw the oil into and force it out of said enclosure member through said inlet and outlet check valves respectively.

5. In an electric power cable which includes an outer lead sheath and a dielectric liquid impregnating porous insulation within said sheath, means for circulating dielectric liquid through said sheath comprising an enclosed supply reservoir providing a source of said liquid at a pressure equal to that within said cable, an inlet conduit leading from said supply reservoir and communicating with the interior of said lead sheath, an inlet check valve in said inlet conduit permitting unidirectional flow of said liquid from said supply reservoir into said lead sheath, an outlet conduit communicating with the interior of said lead sheath at a point remote from the point where said inlet conduit communicates therewith and leading into said reservoir, an outlet check valve in said outlet conduit permitting unidirectional flow of said liquid out of said lead sheath into said reservoir, whereby variations in the temperature of said cable during operation cause contraction and expansion of the liquid therewithin and alternately draw the liquid into and force it out of said enclosure member through said inlet and outlet check valves respectively.

6. In an electric cable which includes an outer lead sheath closely covering at least one conductor insulated with porous material and a dielectric oil impregnating said porous material and contained in passages inside said sheath, means for circulating newly-conditioned dielectric oil through said sheath comprising an enclosed supply reservoir providing a source of said newly-conditioned oil at a pressure equal to that within said cable, an inlet conduit leading from said supply reservoir and communicating with the interior of said sheath, an inlet check valve in said inlet conduit permitting unidirectional flow of said oil from said supply reservoir into said sheath, an enclosed discharge reservoir providing a depository for said oil after its use as a dielectric in said cable, an outlet conduit communicating with the interior of said sheath at a point remote from the point where said inlet conduit communicates therewith and leading to said discharge reservoir, an outlet check valve in said outlet conduit permitting unidirectional flow of said oil out of said sheath into said discharge reservoir, and a recycling system comprising means for withdrawing the used oil from said discharge reservoir and reconditioning it and then returning the reconditioned oil to said supply reservoir, whereby variations in the temperature of said cable during operation cause contraction and expansion of the oil therewithin and alternately draw the oil into and force it out of said enclosure member through said inlet and outlet check valves respectively.

7. In an electric power cable which includes an outer pipe, at least one conductor insulated with porous material enclosed within said pipe, and a pressurized dielectric liquid contained within said pipe and impregnating said porous material, means for circulating dielectric liquid through said pipe comprising an enclosed supply reservoir providing a source of said liquid at a pressure equal to that within said pipe, an inlet conduit leading from said supply reservoir and communicating with the interior of said pipe, an inlet check valve in said inlet conduit permitting unidirectional flow of said liquid from said supply reservoir into said enclosure member, an outlet conduit communicating with the interior of said pipe at a point remote from the point where said inlet conduit communicates therewith and leading into said reservoir, an outlet check valve in said conduit permitting unidirectional flow of said liquid out of said pipe into said reservoir, whereby variations in the temperature of said cable during operation cause contraction and expansion of the liquid therewithin and alternately draw the liquid into and force it out of said enclosure member through said inlet and outlet check valves respectively.

8. In an electric power cable which includes an outer pipe, at least one conductor insulated with porous material enclosed within said pipe, and a pressurized dielectric oil contained within said pipe and impregnating said porous material, means for circulating newly-conditioned dielectric oil through said pipe comprising an enclosed supply reservoir providing a source of said newly-conditioned oil at a pressure equal to that within said cable, an inlet conduit leading from said supply reservoir and communicating with the interior of said pipe, an inlet check valve in said inlet conduit permitting unidirectional flow of said oil from said supply reservoir into said pipe, an enclosed discharge reservoir providing a depository for said oil after its use as a dielectric in said cable, an outlet conduit communicating with the interior of said pipe at a point remote from the point where said inlet conduit communicates therewith and leading into said discharge reservoir, an outlet check valve in said outlet conduit permitting unidirectional flow of said oil out of said pipe into said discharge reservoir, and a recycling system comprising means for withdrawing the used oil from said discharge reservoir and re-conditioning it and then returning the re-conditioned oil to said supply reservoir, whereby variations in the temperature of said cable during operation cause contraction and expansion of the oil therewithin and alternately draw the oil into and force it out of said pipe through said inlet and outlet check valves respectively.

References Cited in the file of this patent

UNITED STATES PATENTS

| | | |
|---|---|---|
| 1,094,231 | Mennesson | Apr. 21, 1914 |
| 1,981,536 | Zapf | Nov. 20, 1934 |
| 2,006,932 | Rosch | July 2, 1935 |
| 2,065,927 | Scott | Dec. 29, 1936 |
| 2,095,090 | Aime | Oct. 5, 1937 |
| 2,423,482 | Chochol | July 8, 1947 |
| 2,587,539 | Seaman | Feb. 26, 1952 |
| 2,590,679 | Callahan | Mar. 25, 1952 |

FOREIGN PATENTS

| | | |
|---|---|---|
| 491,200 | Great Britain | Aug. 29, 1938 |